Patented Jan. 1, 1929.

1,697,122

UNITED STATES PATENT OFFICE.

RUDOLPH KRECH, OF BERLIN-TREPTOW, AND ERICH KEINER, OF BERLIN-WILMERS-DORF, GERMANY, ASSIGNORS, BY MESNE ASSIGNMENTS, TO GRASSELLI DYESTUFF CORPORATION, OF NEW YORK, N. Y., A CORPORATION OF DELAWARE.

POLYAZO DYES DERIVED FROM TETRAZOTIZED HALOGENATED 4.4'-DIAMINO-DIPHENYL-METHANES.

No Drawing. Application filed December 4, 1925, Serial No. 73,254, and in Germany December 16, 1924.

By the present invention dyestuffs of outstanding properties of fastness, and in particular of very good fastness to fulling and light, are obtained by coupling with azo components the 4-diazo-4'-diazo-compound of chloro-substituted 4.4'-diaminodiphenylmethane or a homologue thereof; for instance 4.4'-diamino-3.3'-dichlorodiphenylmethane, 4.4'-diamino-3.3'-dimethyl-2.2'-dichlorodiphenylmethane, 4.4'-diamino-3.3'.6.6'-tetrachlorodiphenylmethane.

These parent materials can be obtained by condensation of the corresponding chloroanilines with formaldehyde and conversion of the condensation product.

The following examples illustrate the invention, without limiting it, the parts being by weight:

1. 34 parts of 4.4'-diamino-3.3'-dichlorodiphenylmethane dihydrochloride are suspended in 150 parts of crude hydrochloric acid of 32 per cent strength and 250 parts of water, and then diazotized as usual at 0° C. The diazo-solution is then combined with 52 parts of sodium 2-naphthol-4-sulphonate in solution alkaline with sodium carbonate. The mixture is heated on the water bath to about 75° C. and the dyestuff is salted out, pressed and dried. It forms a red powder which dyes wool red tints, very fast to washing, fulling, sulphur and light.

2. The diazo-solution prepared as described in Example 1 is mixed with a solution, alkaline with sodium carbonate, of 76 parts of sodium 1-naphthol-3.8-disulphonate. The dyestuff is salted out cold, pressed and dried. It forms a blue red powder which dyes wool red tints fast to fulling and washing and of remarkable fastness to light.

3. The diazo-solution made according to Example 1 is mixed with a solution, made alkaline with sodium carbonate, of 78 parts of 1-acetylamino-8-naphthol-3.6-disulphonic acid. The dried dyestuff forms a violet powder which dyes wool violet tints of good fastness to washing, fulling and sulphur.

4. The diazo-solution obtained in the usual manner from 29.5 parts of 4.4'-diamino-3.3'-dimethyl-2.2'-dichlorodiphenylmethane is mixed with a solution alkaline with sodium carbonate of 1(2'-chlorophenyl-5'-sulphonic acid)-3-methyl-5-pyrazolone and the dyestuff is finished in the usual manner. When dried it is a yellow powder which dyes wool greenish-yellow tints of good fastness to washing and fulling.

Similar tints are yielded by the dyestuff which may be made in accordance with this example by starting from 4.4'-diamino-3.3'.6.6'-tetrachlorodiphenylmethane.

5. The diazo-solution prepared as described in Example 1 is mixed with a solution alkaline with sodium carbonate of 48.8 parts of 2-naphthylamino-6-sulphonic acid. When combination is complete the dyestuff is salted out, pressed and dried. There is obtained a yellow red powder which dyes wool orange tints fast to washing, fulling and sulphur.

6. The diazo-solution made as described in Example 1 is mixed with a solution containing 30 parts of beta-naphthol and 24 parts of caustic soda solution of 40° Baumé specific gravity, with addition of the usual proportion of sodium carbonate. The dyestuff is finished in the known manner. There is obtained a red brown pigment of very good properties of fastness.

The following table gives a summary of dyestuffs which may be made in accordance with the invention. It is not exhaustive and could, indeed, be very much extended.

1,697,122

*(a) Wool dyestuffs*

|  | Azo-component | Color of the powder | Dyeing on wool | Solution in concentrated sulphuric acid |
|---|---|---|---|---|
| 4.4'-diamino-3.3'-dichlorodiphenylmethane. | 2-naphthyl-amino-6-sulphonic acid. | Yellow-red. | Orange. | Violet. |
| Do. | Sodium 2-naphthol-6-sulphonate. | Red. | Reddish orange. | Red. |
| Do. | 2-naphthol-8-sulphonic acid. | Yellow-red. | Yellow-red. | Red-brown. |
| Do. | 1-naphthol-5-sulphonic acid. | Brown. | Red. | Violet. |
| Do. | 1-naphthol-4.8-disulphonic acid. | Bordeaux. | Red. | Red. |
| Do. | 1-naphthol-3.6-disulphonic acid. | Bordeaux. | Red. | Bordeaux. |
| Do. | 1-naphthol-3.8-disulphonic acid. | Bordeaux. | Red. | Red. |
| Do. | 2-naphthol-3.6-disulphonic acid. | Bordeaux. | Red. | Red. |
| Do. | Sodium 2-naphthol-4-sulphonate. | Bordeaux. | Blue-red. | Bordeaux. |
| Do. | Sodium 1-naphthol-4-sulphonate. | Bordeaux. | Blue-red. | Red. |
| Do. | Ethyl-chromotropic acid. | Red-brown. | Blue-red. | Blue. |
| Do. | Chromotropic acid (+). | Bordeaux. | Bordeaux. | Blue. |
| Do. | 1-acetylamino-8-naphthol-3.6-disulphonic acid. | Violet. | Violet. | Bordeaux. |
| Do. | 1-amino-8-naphthol-4-sulphonic acid. | Brown. | Violet. | Blue. |
| Do. | 1.2'-chloro-5'-sulphophenyl-3-methyl-5-pyrazolone. | Yellow. | Greenish-yellow. | Yellow. |
| Do. | 1-phenyl-3-methyl-5-pyrazolone sulphonic acid. | Yellow-brown. | Yellow. | Yellow. |
| 4.4'-diamino-3.3'-6.6'-tetrachlorodiphenylmethane. | 1.2'-chloro-5'-sulphophenyl-3-methyl-5-pyrazolone. | Yellow. | Greenish-yellow. | Yellow. |
| 4.4'-diamino-3.3'-dimethyl-2.2'-dichlorodiphenylmethane. | 1.2'-chloro-5'-sulphophenyl-3-methyl-5-pyrazolone. | Yellow. | Greenish-yellow. | Yellow. |

(+) Gives violet chrome lake.

The structure of the third dyestuff in the above table, formed by coupling 3.3'-dichlorodiphenylmethane with ethyl-chromotropic acid, may be represented by the following formula:

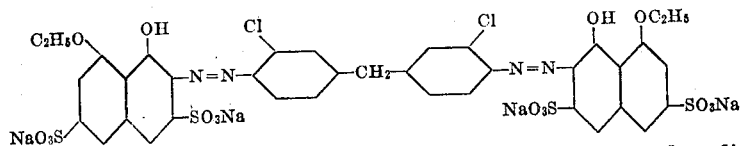

The structure of the seventh dyestuff formed by coupling 3.3'-dichlorodiphenylmethane with 1.2'-chloro-5'-sulpho-phenyl-3-methyl-5-pyrazolone may be represented by the following formula:

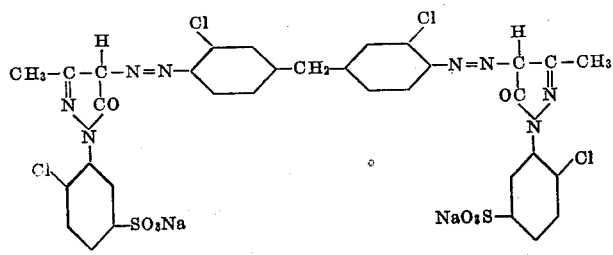

*(b) Cotton dyestuffs*

|  | Azo-component | Color on cotton |
|---|---|---|
| 4.4'-diamino-3.3'-dichlorodiphenylmethane. | 1-amino-8-naphthol-3.6-disulphonic acid. | Violet. |
| Do. | 2-amino-5-naphthol-7-sulphonic acid ⟶ 2-phenylamino-5-naphthol-7-sulphonic acid. | Corinth. |
| Do. | [1-amino-8-naphthol-3.6-disulphonic acid (acid) ⟵ 4-nitraniline] (alkali). | Green-blue. |
| Do. | [1-amino-8-naphthol-3.6-disulphonic acid (alkali) ⟵ 4-nitraniline] (acid). | Green-blue. |
| Do. | 1-amino-8-naphthol-3.6-disulphonic acid (acid) and 2-hydroxynaphthalene (alkali). | Violet. |
| Do. | 2-amino-5-naphthol-7-sulphonic acid. | Bordeaux. |

In the above table the arrows indicate diazotization and coupling and point from the diazo component toward the coupling component.

The structure of the fourth dyestuff given in Table *b* may be represented by the following formula:

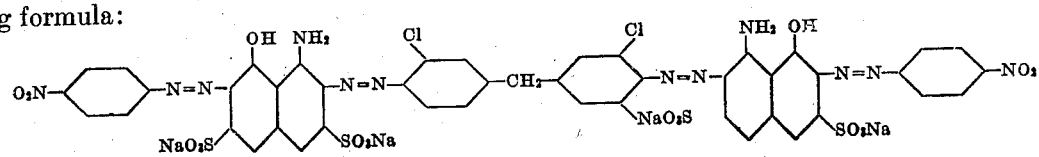

(c) *Lake dyestuffs*

| | Azo-component | Color of the lake |
|---|---|---|
| 4,4'-diamino-3,3'-dichlorodiphenylmethane. | 2-hydroxynaphthalene. | Red-brown. |
| Do. | 2-hydroxynaphthalene-3-carboxylic acid. | Red-brown. |
| Do. | 2-hydroxynaphthalene-3-carboxylic acid-anilide. | Bordeaux. |
| Do. | 1-phenyl-3-methyl-5-pyrazolone. | Yellow. |

As will be apparent from Table *b* the disazo dyestuffs obtained according to the examples can either, in so far as they contain diazotizable aminogroups, be diazotized and combined with further azo components, or in some cases be coupled with diazocompounds.

What we claim is,—

1. The hereindescribed new azo dyes having a very good fastness to fulling and light and corresponding to the general formula:

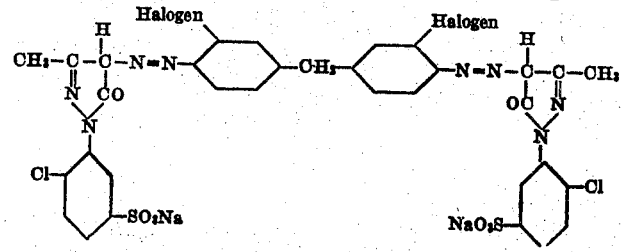

2. The hereindescribed new azo dye having a very good fastness to fulling and light and corresponding to the general formula:

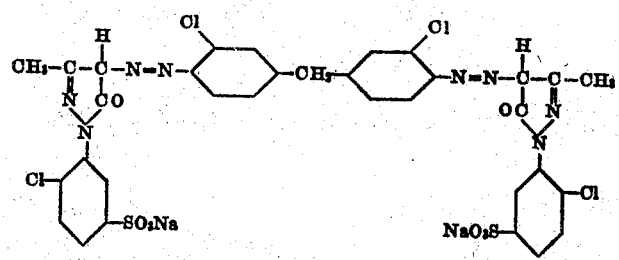

3. The hereindescribed new azo dyes having a very good fastness to fulling and light and corresponding to the general formula:

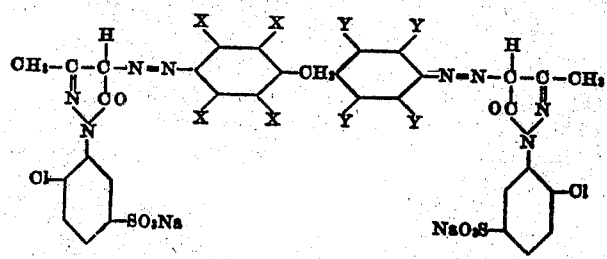

wherein at least one symmetrical X—Y pair represent halogen, and one other symmetrical X—Y pair represent one of the group hydrogen, alkyl, and halogen, and the other X's and Y's represent hydrogen.

In testimony whereof we affix our signatures.

RUDOLPH KRECH.
ERICH KEINER.